United States Patent [19]
Santos et al.

[11] 3,824,769
[45] July 23, 1974

[54] DEVICE FOR REMOVING NOXIOUS MATTER FROM EXHAUST GASES

[76] Inventors: Anthony R. Santos; Ontario R. Santos; Gerald Dean Allen, all of 3298 Avenue 192, Tulare, Calif.

[22] Filed: Oct. 10, 1972

[21] Appl. No.: 295,963

[52] U.S. Cl............... 55/223, 55/227, 55/259, 55/DIG. 30, 60/310, 60/311, 261/116, 261/118
[51] Int. Cl............................................. B01d 47/06
[58] Field of Search ...... 55/DIG. 30, 223, 227, 228, 55/259, 240, 241, 233, 485; 60/309, 310, 311, 317, 319; 261/116, 118

[56] References Cited
UNITED STATES PATENTS

| | | | |
|---|---|---|---|
| 2,862,354 | 12/1958 | Barnhart | 55/DIG. 30 |
| 3,032,968 | 5/1962 | Novak et al. | 55/233 |
| 3,383,854 | 5/1968 | White | 55/DIG. 30 |
| 3,476,524 | 11/1969 | Burke | 123/119 A |
| 3,667,193 | 6/1972 | McKenzie | 55/227 |
| 3,712,031 | 1/1973 | Santa Cruz | 55/DIG. 30 |

*Primary Examiner*—Bernard Nozick
*Attorney, Agent, or Firm*—Huebner & Worrel

[57] ABSTRACT

A device for removing noxious matter from a stream of exhaust gases as the stream is projected from an exhaust conduit. The invention is characterized by a tubular chamber which receives the exhaust gas, a water bath for washing and cooling the gas, and a circulating system including a sump located beneath the chamber for collecting granulated water and a circuit for returning water from the sump to the water bath.

1 Claim, 7 Drawing Figures

PATENTED JUL 23 1974 3,824,769

DEVICE FOR REMOVING NOXIOUS MATTER FROM EXHAUST GASES

BACKGROUND OF THE DISCLOSURE

The invention relates to a device for removing noxious matter from a stream of gas and more particularly to a device for removing selected by-products of combustion from exhaust gases emanating from a gas generator.

It is, of course, well known that organic fuels serve as a primary source of energy in our society. It is common practice to employ such fuels in the operation of internal combustion engines and boilers of various sorts. Furthermore, a burning of organic matter often occurs when employing known waste disposal units.

Historically, only slight attention has been paid to the disposal of by-products of combustion. However, an ever increasing interest is being exhibited in the elimination from the atmosphere of noxious matter such as that which results from the burning of hydrocarbon fuels in internal combustion engines, as well as waste burned in disposal operations. This necessarily requires that the quantity of by-products of combustion introduced into the atmosphere be eliminated or, at least, substantially reduced. As a consequence, various systems have been proposed for "cleaning" exhaust gases, particularly those derived from the burning of hydrocarbons in internal combustion engines and the like. Such devices include systems for recycling unburned hydrocarbons and system for entrapping and storing the exhaust gases, as well as systems for chemically treating the exhaust gases for removing the noxious matter.

Unfortunately, the systems heretofore made available are of a rather complex nature, are not economically feasible, normally require substantial maintenance, and generally prove to be unsatisfactory.

Accordingly, it is the general purpose of this invention to provide a simple, economic, and practical device for removing noxious matter from exhaust gases generated through a burning of organic materials.

OBJECTS AND SUMMARY OF THE INVENTION

It is therefore an object of the instant invention to provide an improved device for removing noxious matter from exhaust gases.

It is another object to provide an improved device for removing noxious matter from a stream of exhaust gases derived through a burning of organic materials.

It is another object to provide an improved device for removing by-products of combustion derived through an oxidation of hydrocarbons, including particulate matter, water soluble gases and heat.

These and other objects and advantages are achieved through the use of a simple chamber, coaxially related to an exhaust stack, including therein a packing suitable for performing a filtering function, a water bath through which the exhaust gases are passed, prior to being passed through the packing, and a circulating system including a sump for receiving gravitating water for returning the water to the water bath, as will become more readily apparent by reference to the following description and claims in light of the accompanying drawings.

DESCRIPTION OF THE PREFERRED EMBODIMENTS

First Embodiment

Figure 1:
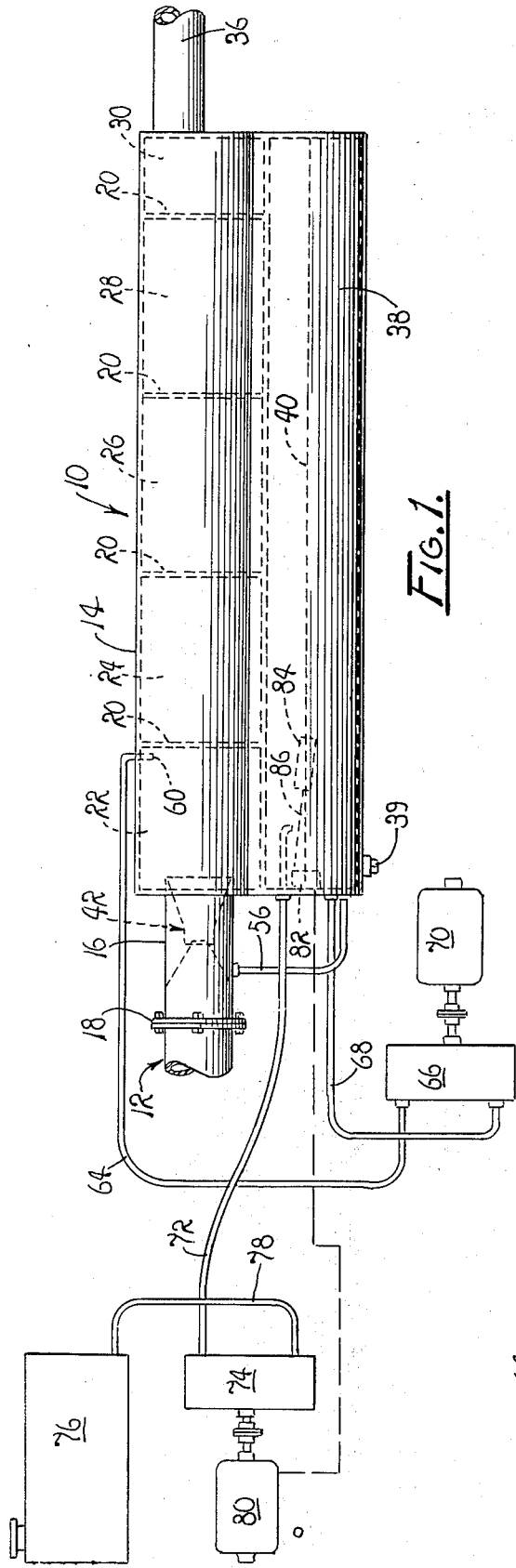
FIG. 1 is a side view of a device which constitutes a first embodiment of the principles of the instant invention.
Figure 2:
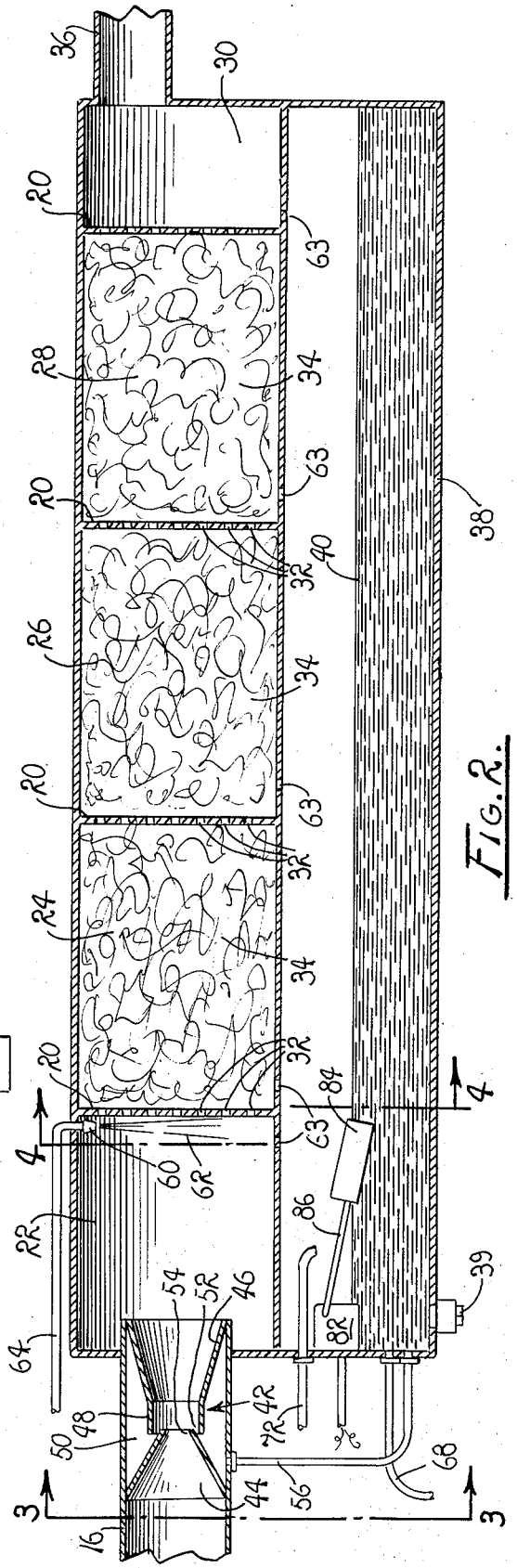
FIG. 2 is a cross-sectional view, taken along a vertical plane, of the device shown in FIG. 1, but on somewhat of an enlarged scale.
Figure 3:
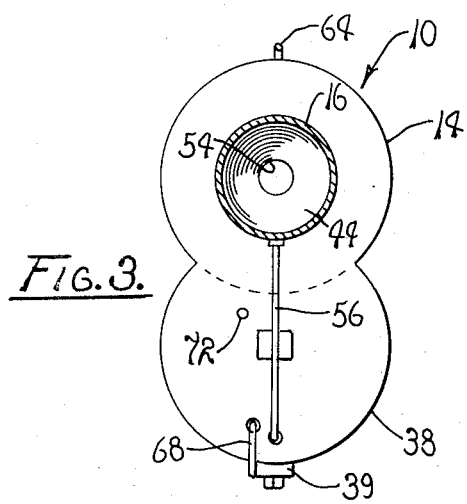
FIG. 3 is a cross-sectional view, taken generally along line 3—3 of FIG. 2.
Figure 4:
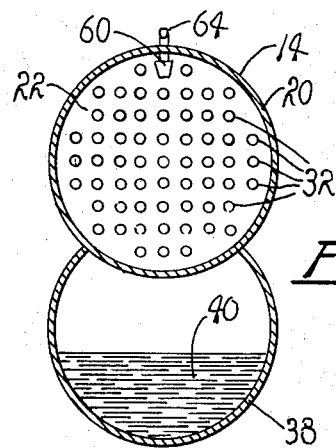
FIG. 4 is a partially sectioned view, taken generally along line 4—4 of FIG. 2.

Referring now to the drawings wherein like reference characters designate like or corresponding parts throughout the several views, there is shown in FIG. 1 a device, generally designated 10, which constitutes a first embodiment of the principles of the instant invention.

As shown in FIG. 1, the device 10 is horizontally disposed and coupled with a horizontally projected exhaust stack, designated 12. When employed with a combustion engine of the type frequently found in automobiles and the like, the exhaust stack 12 normally is suspended in a horizontal disposition beneath the automobile. Therefore, the form of the invention shown in FIGS. 1 through 4 of the drawings, has particular utility with automotive engines even though it can be employed equally as well with other sources of exhaust gases such as industrial engines, waste burners and the like.

As shown, the device 10 includes a suitable housing 14, preferably of a tubular configuration, having an intake pipe 16 extended from the housing 14 and mated with the exhaust stack 12. As a practical matter, the intake pipe 16 is mated in an abutting fashion with the exhaust stack 12. A sealed coupling between the stack 12 and the intake pipe 16 is achieved through a use of any suitable coupling ring 18. Since the particular manner in which the exhaust stack 12 and the intake pipe 16 is achieved is, in practice, varied as found practical, a detailed description of the coupling is omitted in the interest of brevity.

As should be apparent, the housing 14 is fabricated from any suitable heat resistant material including steel, aluminum and the like. Such materials, of course, are commonly employed in fabricating exhaust systems for internal combustion engines. Furthermore, the specific configuration of the housing 14 is deemed to be a matter of convenience and is varied in a manner dictated by the intended environment for the device. Similarly, the techniques employed in fabricating the device 10 are consistent with the techniques commonly employed in fabricating known exhaust systems.

Within the housing 14 there is provided a plurality of separator plates 20 which serve to divide the housing 14 into a plurality of axially aligned compartments 22, 24, 26, 28 and 30. As shown, each of the plates 20 includes a plurality of port-like openings 32, best shown in FIG. 4, which permits gas to pass through the compartments 22 through 30 in succession.

Within the compartments 24, 26 and 28 there is deposited a packing 34, formed of a substantially incombustible or fireproof material. The packing 34 is employed to perform a filtering function and may be fabricated from any suitable material including steel wool, shredded metal and synthetic resins of a suitable form. In any event, it is to be understood that the packing 34 is configured to perform a filtering function for removing particulate matter from exhaust gases as they are passed through the chambers.

Preferably, the compartments 22 and 30 comprise plenum chambers and are not filled with the packing 34 in order to reduce back pressures as a stream of gas is delivered to the device 10 via the intake pipe 16. As a practical matter, a terminal exhaust stack 36 is provided for delivering "clean" and "cool" gas away from the device 10, subsequent to its passage therethrough.

Immediately beneath the housing 14 there is provided an auxiliary tank 38 having a drain plug 39. This tank functions as a sump for retaining therein a body of water 40 to be utilized as a supply in establishing a water bath employed in cleansing the aforementioned exhaust gases. The water bath, in effect, performs a scrubbing of the gases at a pair of axially spaced locations, relative to the device 10. The first location at which scrubbing occurs is found within the intake pipe 16, before the gas enters the housing. In order to achieve this, there is provided a Venturi throat, generally designated 42, located upstream from the compartment 22. The throat 42 is formed by an upstream wall component 44 of the truncated conical configuration, tapered in a downstream direction, and a downstream wall component 46, also of a truncated conical configuration, tapered in an upstream direction. The wall components 44 and 46 communicate through a coaxially aligned tubular wall segment 48.

It is important here to note that the wall components 44 and 46 of the Venturi throat 42 are hermetically sealed within the intake pipe 16. Consequently, there is provided about the tubular wall segment 48 a circumscribing plenum chamber 50. Communication between the chamber 50 and the Venturi throat 42 is established through an annular orifice 52 established between the adjacent portions of the downstream end of the upstream wall component 44 and the upstream end of the tubular wall component 48. Preferably, the orifice 52 is coaxially related with a downstream opening, designated 54, provided in the plane of truncation for the upstream wall component 44. Thus, it is apparent that as exhaust gases are passed through the Venturi throat 42, a vacuum is drawn through the orifice 52 and established within the chamber 50.

As a practical matter, the annular orifice 52 serves as an injection port for injecting an annular stream of water into the stream of exhaust gases passing through the Venturi throat 42 for scrubbing the gas prior to its delivery to the compartment 22. This water is drawn from the body of water 40 and delivered to the chamber 50, via a conduit 56 as a result of the vacuum established within the chamber 50. The conduit 56 preferably is a deformed length of tubing through which the chamber 50 of the intake pipe 16 communicates with the auxiliary tank 38.

The second location at which scrubbing of the gases occurs is found within the compartment 22 adjacent a spray head 60. This head is directed transversely to the stream of exhaust gases exiting the intake pipe 16 and directs a stream of water 62 which performs a further scrubbing function. As a practical matter, the head 60 is so configured as to deliver the water as a spray of water particles. As shown, the head 60 is mounted in close proximity with an adjacent plate 20 so that all gases passing through the ports 32 of the plate 20 must pass through the stream 62 prior to entering the ports. Thus, a final washing of the gases is completed.

In practice, a substantial quantity of water is carried through the ports 32 into the chamber 24. Of course, the total quantity of water, in its liquid form, ultimately delivered to the compartment 30 is minimal due to the evaporating effects of the exhaust gases acting thereon. However, each of the compartments 22 through 30 are provided with discharge ports 63 so that water entrapped within the compartments is afforded an opportunity to gravitate into the auxiliary tank 38 and thereby again form a part of the body of water 40. As the water is returned to the tank 38 particulate matter washed from the gases and entrapped condiments are carried along by the water and ultimately deposited within the tank.

The body of water 40 also serves as the source from which water is supplied to the spray head 60. The water is delivered to the head 60 through a tubular conduit 64 extended from the discharge side of a suitable pump 66. The intake side of the pump 66, in turn, is coupled with the tank 38 via a tubular conduit 68. Thus, water drawn from the body of water 40 by the pump 66 is delivered to the head 60. The pump 66 is driven in any suitable manner and by any suitable device including an auxiliary motor 70. Where desired, the pump 66 can be driven through a power train coupled with the internal combustion engine from which the gases are expelled.

In order to maintain the quantity of water of the body 40 substantially constant, there is provided a delivery system including a conduit 72 which terminates within the auxiliary tank 38 and is coupled at the discharge side of a suitable pump 74. The pump 74 is quite similar to the pump 66 and is fed from a suitable reservoir 76 through a tubular conduit 78. The pump 74 is driven by any suitable means, including a motor 80.

In order to control the operation of the pump 74, a level sensing switch 82 is coupled with a power control circuit, not designated, provided for the motor 80. The switch 82 is opened and closed in response to the movement of a float 84 disposed and supported at the surface of the body of water 40, coupled with the switch 82 through a lever arm 86. Of course, it is to be understood as the level of water rises and falls within the tank 38, the float 84 rises and falls therewith and thus serves to open and close the switch 82 for controlling the operation of the motor 80. Consequently, the motor responds to changes occurring in the level of the body of water 40 so that the level is maintained substantially constant within the auxiliary tank as water is delivered therefrom via the conduits 56 and 68 and returned thereto via the ports 63.

Second Embodiment

Figure 6:
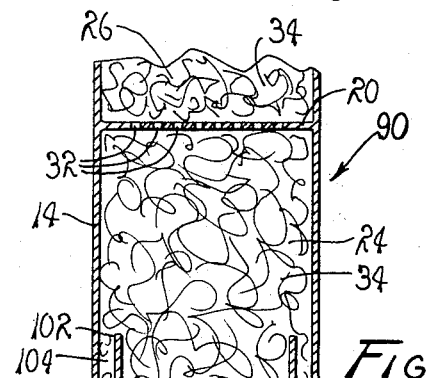
FIG. 6 is a cross-sectional view, taken generally along line 6—6 of FIG. 5.
Figure 7:
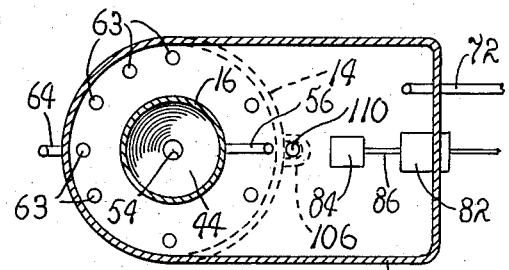
FIG. 7 is a bottom end view of the device shown in FIG. 5.
Figure 5:
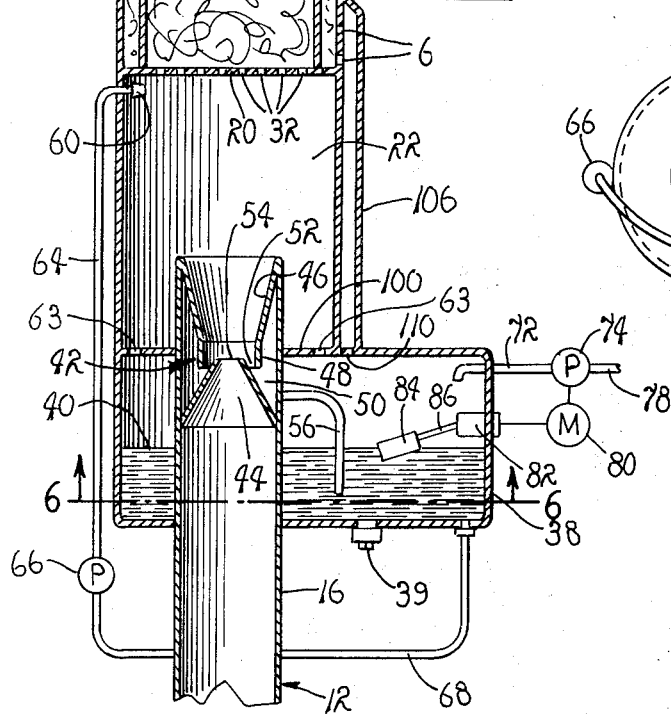
FIG. 5 is a cross-sectional view, taken in a vertical plane, of another embodiment of the instant invention.

A second embodiment of the invention is illustrated in FIGS. 5, 6 and 7. This embodiment comprises a device, generally designated 90, and includes the structural components hereinbefore described. Therefore, the components of the device 90 are designated similarly.

The basic apparent difference existing between the first and second embodiments of the invention is that the second embodiment is particularly suited for use with vertically oriented exhaust stacks. Consequently, the auxiliary tank 38 is axially aligned with the compartment 22 of the housing 14 while the ports 63 are provided in an end wall 100 so that the water injected into the throat 42 and the chamber is free to gravitate into the tank 38.

Further, within the compartment 24 there is provided a partial wall 102, of a cylindrical configuration which defines a cylindrical chamber 104 adjacent the lowermost ported plate 20, or the plate which separates the compartments 22 and 24. The chamber 104 functions as a catch basin into which water carried into the compartment 24 is permitted to gravitate and enhances a return of the water to the tank 38. Extending between the tank 38 and the chamber 104 there is a suitable conduit 106 which communicates with the chamber 104, through a plurality of ports 63 and with the auxiliary tank 38 through ports 110. Hence, water forced upwardly from the chamber 22 is permitted to gravitate downwardly and return to the tank 38.

OPERATION

It is believed that in view of the foregoing description the operation of the device will be readily understood and it will be briefly reviewed at this point.

In view of the fact that both forms of the invention operate in substantially the same manner, a description of the operation of the device 10 will suffice to provide a complete understanding of the claimed invention.

The device 10 is coupled with an exhaust stack 12, preferably employing a coupling ring 18. As combustion occurs within a source of exhaust gases from which the stack 12 extends, a stream of such gases is established through the stack 12, the intake pipe 16 and thence to the device 10. The gases, of course, flow through the Venturi throat 42 mounted within the intake pipe 16. As the gases pass through the Venturi throat, a vacuum is established within the circumscribing plenum chamber 50, whereupon water is drawn from the auxiliary tank 38, via the conduit 56. Thereafter, the water is injected into the Venturi throat through the annular orifice 52. This injection of water into the stream of exhaustion gases serves to scrub the gases, by washing particulate matter from the stream, as well as to cool the stream of gases prior to the exit thereof into the compartment 22. As the gases are passed into the compartment 22, it is permitted to exit therefrom through the ports 32 of the plate 20. As a practical matter, the compartment 22 is a high-pressure chamber while the compartment 30 is a low-pressure chamber. Hence, it can be appreciated that the stream of gases is a constant stream which is afforded passage from a high-pressure zone to a low-pressure zone through the ports 32.

A further washing and cooling of the stream of exhaust gases occurs as the spray head 60 injects a stream of water particles into the stream of exhaust gases. Thus, the stream of gas is washed and cooled at axially spaced locations prior to its exit from the compartment 22.

Of course, as heat is extracted from the gases, a substantial evaporation of the water occurs. As evaporation occurs, the particulate matter suspended therein gravitates with the water remaining in its liquid form through the ports 63 and thus returned to the auxiliary tank 38. Of course, the tank 38 is flushed as often as is desired simply by removing the plug 39 for washing the particulate matter therefrom. In any event, it is to be understood that the water of the body 40 is continuously recycled through the device with the particulate matter and condiment being delivered to the tank 38.

Of course, for reasons which readily should be apparent, it can be appreciated that the pressure within the auxiliary tank 38 is equal to or even greater than the pressure developed within the compartments of the housing 14, due to the fact that the multiplicity of ports 32 provide a low-pressure path through the device. Thus, there is little tendency for the gases to bypass the compartments 24, 26 and 28.

In view of the foregoing, it should readily be apparent that the device of the instant invention provides a practical and economic solution to the problem of removing by-products of combustion from exhaust gases emanating from a source such as an internal combustion engine and the like.

Although the invention has been herein shown and described in water are conceived to be the most practical and preferred embodiments, it is recognized that departures may be made therefrom within the scope of the invention, which is not to be limited to the illustrative details disclosed.

Having described our invention, what we claim as new and desire to secure by Letters Patent is:

1. A device for removing noxious matter from a stream of heated gases comprising:
    A. means defining an elongated chamber having a plurality of ported partitions supported in axially spaced relation for defining therebetween a plurality of axially aligned compartments, and means defining a sump disposed beneath said plurality of compartments, adapted to confine a body of water;

B. means for introducing a stream of heated gases into said chamber including a gas conduit having one end thereof connected with a source of heated gases and the opposite end thereof connected with said elongated chamber;

C. means for scrubbing and cooling the gases of said stream with water particles comprising,
        1. initial scrubbing means including means defining within said conduit a venturi throat having one end thereof disposed adjacent to said chamber, means defining within the throat of circumscribing, axially directed port, means defining in circumscribing relation with said port a plenum chamber, and a tubular conduit extended between said plenum chamber and said sump adapted to deliver a stream of water from the sump to the plenum chamber as low pressure is introduced into said plenum chamber in response to a passage of heated gases through said throat, whereby an annular jet of water particles is drawn through said port into said stream of gases, and
2. final scrubbing means including a spray head mounted in said chamber in axially spaced relation with said throat for injecting a transversely oriented stream of water particles into said stream of gases, and means including a tubular conduit connected with said spray head adapted to deliver a pressurized stream of water to said head;

D. filter packing disposed within selected compartments of said plurality of compartments for filtering particulate matter from said stream of gas; and E. means defining within each of said compartments a plurality of ports through which the compartments communicate with said sump.

* * * * *

UNITED STATES PATENT OFFICE
CERTIFICATE OF CORRECTION

Patent No. 3,824,769                Dated   July 23, 1974

Inventor(s) Anthony R. Santos; Ontario R. Santos; Gerald Dean Allen

It is certified that error appears in the above-identified patent and that said Letters Patent are hereby corrected as shown below:

Column 6, line 32, delete "water" and insert "what are".

line 58, delete "of" and insert "a".

Signed and sealed this 5th day of November 1974.

(SEAL)
Attest:

McCOY M. GIBSON JR.                    C. MARSHALL DANN
Attesting Officer                      Commissioner of Patents